United States Patent
Shapira

(10) Patent No.: US 9,287,944 B2
(45) Date of Patent: Mar. 15, 2016

(54) SYSTEM AND METHOD FOR ALLOWING MULTIPLE STATIONS IN A NETWORK TO USE MU-MIMO TRANSMIT BEAMFORMING

(75) Inventor: Nir Shapira, Ra'anana (IL)

(73) Assignee: Celeno Communications Ltd., Raanana (IE)

( * ) Notice: Subject to any disclaimer, the term of this patent is extended or adjusted under 35 U.S.C. 154(b) by 0 days.

(21) Appl. No.: 13/330,282

(22) Filed: Dec. 19, 2011

(65) Prior Publication Data

US 2012/0155401 A1 Jun. 21, 2012

Related U.S. Application Data

(60) Provisional application No. 61/425,113, filed on Dec. 20, 2010.

(51) Int. Cl.
| | |
|---|---|
| *H04B 7/04* | (2006.01) |
| *H04W 4/08* | (2009.01) |
| *H04L 29/08* | (2006.01) |
| *H04B 7/06* | (2006.01) |
| *H04W 72/04* | (2009.01) |
| *H04W 72/12* | (2009.01) |

(52) U.S. Cl.
CPC ............ *H04B 7/0452* (2013.01); *H04B 7/0617* (2013.01); *H04L 29/08387* (2013.01); *H04W 4/08* (2013.01); *H04W 72/046* (2013.01); *H04W 72/121* (2013.01)

(58) Field of Classification Search
CPC ....... H04W 72/121; H04W 4/06; H04W 4/08; H04L 12/1822; H04L 29/08328; H04L 29/08387; H04L 47/828
USPC .................................................. 370/310–350
See application file for complete search history.

(56) References Cited

U.S. PATENT DOCUMENTS

| | | | | |
|---|---|---|---|---|
| 5,042,083 | A * | 8/1991 | Ichikawa | H04W 16/14 370/447 |
| 6,194,687 | B1 * | 2/2001 | Joseph et al. | 219/217 |
| 8,170,488 | B2 * | 5/2012 | Cordeiro | H04B 7/0682 370/338 |
| 8,255,533 | B2 * | 8/2012 | Shirakata et al. | 709/225 |
| 8,289,939 | B2 * | 10/2012 | Jose | H04W 72/1257 370/338 |
| 8,326,979 | B2 * | 12/2012 | Nielsen | 709/224 |
| 8,914,015 | B2 * | 12/2014 | Kim et al. | 455/419 |
| 2002/0061031 | A1 * | 5/2002 | Sugar | H04W 16/14 370/466 |
| 2002/0136233 | A1 * | 9/2002 | Chen | H04W 72/1215 370/445 |
| 2002/0173272 | A1 * | 11/2002 | Liang | H04W 72/1215 455/63.1 |
| 2005/0078616 | A1 * | 4/2005 | Nevo | H04L 12/66 370/278 |
| 2006/0250987 | A1 * | 11/2006 | White et al. | 370/260 |
| 2007/0021137 | A1 * | 1/2007 | Kokkonen et al. | 455/518 |

(Continued)

OTHER PUBLICATIONS

IEEE-Std 802.11, 1999 Edition (ISO/IEC 8802-11: 1999).

(Continued)

*Primary Examiner* — Warner Wong
(74) *Attorney, Agent, or Firm* — Pearl Cohen Zedek Latzer Baratz LLP

(57) ABSTRACT

System and method for Multi-User (MU) Multiple-Input-Multiple-Output (MIMO) transmission, the method including assigning to an originator station in a MU-MIMO wireless communication network, said originator station separate from a primary beamformer of the MU-MIMO communication network, permission for MU group management, and performing MU-MIMO transmission by the originator station to a plurality of stations in the MU-MIMO communication network.

44 Claims, 3 Drawing Sheets

(56) References Cited

U.S. PATENT DOCUMENTS

| | | | |
|---|---|---|---|
| 2007/0023423 A1* | 2/2007 | Suzuki et al. | 219/633 |
| 2007/0223422 A1* | 9/2007 | Kim et al. | 370/334 |
| 2009/0303952 A1* | 12/2009 | Hosokawa | 370/329 |
| 2010/0065728 A1* | 3/2010 | Choi | H04W 84/18 250/252.1 |
| 2011/0096738 A1* | 4/2011 | Choi | 370/329 |
| 2012/0163483 A1* | 6/2012 | Stacey et al. | 375/260 |
| 2012/0213122 A1* | 8/2012 | Gong | 370/254 |
| 2013/0016680 A1* | 1/2013 | Au et al. | 370/329 |

OTHER PUBLICATIONS

IEEE-Std 802.11b-1999 Supplement to 802.11-1999, Wireless LAN MAC and PHY Specifications: Higher Speed Physical Layer (PHY) Extension in the 2.4 GHz Band.

IEEE-Std 802.11a-1999 Higher Speed Physical Layer (PHY) Extension in the 5 GHz Band.

Vermani et al. Frame Format for GroupID Management, IEEE 802.11-10/ 1288rl1, Nov. 2010.

\* cited by examiner

US 9,287,944 B2

SYSTEM AND METHOD FOR ALLOWING MULTIPLE STATIONS IN A NETWORK TO USE MU-MIMO TRANSMIT BEAMFORMING

CROSS REFERENCE TO RELATED APPLICATIONS

This application claims the benefit of U.S. Provisional Application Ser. No. 61/425,113, filed on Dec. 20, 2010 and entitled A SCHEME FOR ALLOWING MULTIPLE STATIONS IN A NETWORK TO USE MU-MIMO TRANSMIT BEAMFORMING, the entire contents of which are incorporated herein by reference.

BACKGROUND OF THE INVENTION

Spatial Division Multiple Access (SDMA) is a method of multiplexing several signal streams, each one targeted to a different destination, simultaneously, by utilizing multiple transmit antennas. An SDMA channel access method may enable the use of the same frequency at the same time to communicate with several stations (STAs, also referred to as nodes, receivers, beamformees or users) located in different places. For example, in Multi-User Multiple-Input-Multiple-Output (MU-MIMO) communication systems, a multi-antenna beamformer, which is typically the SDMA Access Point (AP), may transmit simultaneously to a group of STAs, using SDMA technique. A group of STAs that the beamformer transmits to in a single transmission is referred to as a MU group.

The IEEE 802.11ac standard, which supports downlink (DL) MU-MIMO technology, defines the capability for a beamformer, typically an AP, to transmit several simultaneous streams to several stations in a network in the downlink direction. As used herein, the downlink direction is used to mean the direction from a beamformer to one or more stations receiving the beamformed signals. Also, as used herein, MU-MIMO transmission refers to transmission of several simultaneous streams to several stations in a network in the downlink direction.

MU-MIMO transmission requires a scheme for MU group management. For example, according to a prior art scheme operable under the IEEE 802.11 ac standard, a single beamformer, which is typically the AP, may group users into MU groups using the unicast MU group assignment frame. Thus only a single predetermined and unchangeable entity in a network is permitted to perform tasks related to MU group management, such as grouping users into MU groups, changing these MU groups and notifying the STAs of their group assignments.

SUMMARY OF THE INVENTION

According to embodiments of the present invention, there is provided a method for Multi-User (MU) Multiple-Input-Multiple-Output (MIMO) transmission, the method may include assigning to an originator station in a MU-MIMO wireless communication network, the originator station separate from a primary beamformer of the MU-MIMO communication network, permission for MU group management.

Furthermore, according to embodiments of the present invention, the method may include performing MU-MIMO transmission by the originator station to a plurality of stations in the MU-MIMO communication network.

Furthermore, according to embodiments of the present invention, the primary beamformer in the MU-MIMO communication network may refrain from performing MU-MIMO transmission while permission for MU-MIMO group management is assigned to the originator station.

Furthermore, according to embodiments of the present invention, assigning said permission for MU group management may include transferring to the originator station Multi-User (MU) group definitions that were previously made by the primary beamformer.

Furthermore, according to embodiments of the present invention, the method may include transmitting a notification by the primary beamformer to a plurality of stations in the MU-MIMO communication network, the notification identifying the originator station as a permitted MU-MIMO group manager.

Furthermore, according to embodiments of the present invention, assigning the permission for MU group management may include allocating to the originator station a dedicated plurality of Multi-User (MU) groups.

Furthermore, according to embodiments of the present invention, the method may include performing MU-MIMO transmission by the originator station to stations pertaining to the dedicated plurality of MU groups.

Furthermore, according to embodiments of the present invention the primary beamformer may refrain from performing MU-MIMO transmission to the dedicated plurality of MU groups while the permission for MU-MIMO transmission is assigned to the originator station, and wherein the primary beamformer may continue to perform MU-MIMO transmission to MU groups excluding the dedicated plurality of MU groups.

Furthermore, according to embodiments of the present invention, assigning the permission for MU-MIMO transmission may include allocating to the originator station a first dedicated plurality of Multi-User (MU) groups, and the method may include: assigning to at least one additional originator station in the MU-MIMO communication network, the additional originator station being separate from the primary beamformer, permission for MU-MIMO group management, wherein assigning the permission to the at least one additional originator station may include allocating to each of the at least one additional originator station a corresponding dedicated plurality of Multi-User (MU) groups; and wherein the primary beamformer may refrain from performing MU-MIMO transmission to the dedicated plurality of MU groups while the permission for MU-MIMO transmission is assigned to the at least one additional originator station, and wherein the primary beamformer may continue to perform MU-MIMO transmission to MU groups excluding the dedicated plurality of MU groups.

Furthermore, according to embodiments of the present invention, the method may include performing MU-MIMO transmission by the additional originator station to stations pertaining to its respective of MU groups.

Furthermore, according to embodiments of the present invention, the method may include transmitting a notification by the primary beamformer to the plurality of stations, the notification identifying the at least one additional originator station as a permitted MU-MIMO transmitter and informing of the dedicated MU groups respectively assigned to the at least one additional originator station.

Furthermore, according to embodiments of the present invention, the method may include dynamically allocating the dedicated MU groups to the originator stations.

Furthermore, according to embodiments of the present invention, dynamically allocating the dedicated MU groups may include: requesting a first selected originator station to stop transmitting to a selected MU group, the selected MU group has been previously assigned to the first selected originator station; and allocating the selected MU group to a second selected originator station.

Furthermore, according to embodiments of the present invention, dynamically allocating the dedicated MU groups may include: receiving an acknowledgment from the first selected originator station that it is no longer transmitting to the selected MU group prior to allocating the selected MU group to the second selected originator station.

Furthermore, according to embodiments of the present invention, the method may include receiving a request from the originator station to be assigned permission for MU-MIMO group management prior to assigning the permission for MU group management.

Furthermore, according to embodiments of the present invention, the primary beamformer may be an access point (AP).

According to embodiments of the present invention, there is provided a method for Multi-User (MU) Multiple-Input-Multiple-Output (MIMO) group management by a non-primary beamformer originator station of a MU-MIMO communication network, the method may include: receiving, at the non-primary beamformer originator station, notification of an assignment, from a primary beamformer of the MU-MIMO communication network, of permission for MU-MIMO group management by the non-primary beamformer originator station.

Furthermore, according to embodiments of the present invention, the method may include performing MU-MIMO transmission by the non-primary beamformer originator station to a plurality of stations in the MU-MIMO communication network.

Furthermore, according to embodiments of the present invention, the method may include receiving, at the non-primary beamformer originator station from the primary beamformer, a notification comprising indices of dedicated Multi-User (MU) groups allocated to the originator station.

Furthermore, according to embodiments of the present invention, the method may include transmitting, a notification by the non-primary beamformer originator station to a plurality of stations in the MU-MIMO communication network, the notification informing the receiving stations of their MU group membership status and of the corresponding range of MU group indices that were allocated to the non-primary beamformer originator station.

Furthermore, according to embodiments of the present invention, the method may include receiving at the non-primary beamformer originator station, from the primary beamformer, Multi-User (MU) group definitions.

Furthermore, according to embodiments of the present invention, the method may include transmitting a notification to the primary beamformer, the notification indicating that the non-primary beamformer originator station is no longer transmitting to a MU group that has been previously assigned to the non-primary beamformer originator station.

Furthermore, according to embodiments of the present invention, the method may include forming at the non-primary beamformer originator station Multi-User (MU) groups.

Furthermore, according to embodiments of the present invention, the method may include prior to receiving notification of the assignment, sending by the non-primary beamformer originator station a request to the primary beamformer to be assigned permission for MU-MIMO transmission.

According to embodiments of the present invention, there is provided a primary beamformer. The primary beamformer may include: a processor; and a computer usable medium connected to the processor, wherein the computer usable medium contains a set of instructions for performing a multiple-user multiple-input multiple-output (MU-MIMO) transmission in a MU-MIMO communication network, wherein the processor may be designed to carry out a set of instructions to perform a method of: assigning to an originator station in a MU-MIMO wireless communication network, the originator station separate from the primary beamformer of the MU-MIMO communication network, permission for MU group management.

Furthermore, according to embodiments of the present invention, the processor may be designed to carry out a set of instructions to perform a method of: refraining from performing MU-MIMO transmission while permission for MU-MIMO group management is assigned to the originator station.

Furthermore, according to embodiments of the present invention, the processor may be designed to carry out a set of instructions to perform a method of: transferring to the originator station Multi-User (MU) group definitions that were previously made by the primary beamformer.

Furthermore, according to embodiments of the present invention, the processor may be designed to carry out a set of instructions to perform a method of: transmitting a notification by the primary beamformer to a plurality of stations in the MU-MIMO communication network, the notification identifying the originator station as a permitted MU-MIMO group manager.

Furthermore, according to embodiments of the present invention, the processor may be designed to carry out a set of instructions to perform a method of: allocating to the originator station a dedicated plurality of Multi-User (MU) groups.

Furthermore, according to embodiments of the present invention, the processor may be designed to carry out a set of instructions to perform a method of: refraining from performing MU-MIMO transmission to the dedicated plurality of MU groups while the permission for MU-MIMO transmission is assigned to the originator station; and continuing to perform MU-MIMO transmission to MU groups excluding the dedicated plurality of MU groups.

Furthermore, according to embodiments of the present invention, assigning the permission for MU-MIMO transmission may include allocating to the originator station a first dedicated plurality of Multi-User (MU) groups and wherein the processor may be designed to carry out a set of instructions to perform a method of: assigning to at least one additional originator station in the MU-MIMO communication network, the additional originator station being separate from the primary beamformer, permission for MU-MIMO group management, wherein assigning the permission to the at least one additional originator station may include allocating to each of the at least one additional originator station a corresponding dedicated plurality of Multi-User (MU) groups; and refraining from performing MU-MIMO transmission to the dedicated plurality of MU groups while the permission for MU-MIMO transmission is assigned to the at least one additional originator station; and continuing to perform MU-MIMO transmission to MU groups excluding the dedicated plurality of MU groups.

Furthermore, according to embodiments of the present invention, the processor may be designed to carry out a set of instructions to perform a method of: transmitting a notification by the primary beamformer to the plurality of stations, the notification identifying the at least one additional originator station as a permitted MU-MIMO transmitter and informing of the dedicated MU groups respectively assigned to the at least one additional originator station.

Furthermore, according to embodiments of the present invention, the processor may be designed to carry out a set of instructions to perform a method of: dynamically allocating the dedicated MU groups to the originator stations.

Furthermore, according to embodiments of the present invention, dynamically allocating the dedicated MU groups may include: requesting a first selected originator station to stop transmitting to a selected MU group, the selected MU group has been previously assigned to the first selected originator station; and allocating the selected MU group to a second selected originator station.

Furthermore, according to embodiments of the present invention, dynamically allocating the dedicated MU groups may include: receiving an acknowledgment from the first selected originator station that it is no longer transmitting to the selected MU group prior to allocating the selected MU group to the second selected originator station.

Furthermore, according to embodiments of the present invention, the processor may be designed to carry out a set of instructions to perform a method of: receiving a request from the originator station to be assigned permission for MU-MIMO group management prior to assigning the permission for MU group management.

According to embodiments of the present invention there is provided a non-primary beamformer originator station. The non-primary beamformer originator station may include: a processor; and a computer usable medium connected to the processor, wherein the computer usable medium contains a set of instructions for group management by the non-primary beamformer originator station in a MU-MIMO communication network, wherein the processor may be designed to carry out a set of instructions to perform a method of: receiving, at the non-primary beamformer originator station, notification of an assignment, from a primary beamformer of the MU-MIMO communication network, of permission for MU-MIMO group management by the non-primary beamformer originator station.

Furthermore, according to embodiments of the present invention, the processor may be designed to carry out a set of instructions to perform a method of: performing MU-MIMO transmission by the non-primary beamformer originator station to a plurality of stations in the MU-MIMO communication network.

Furthermore, according to embodiments of the present invention, the processor may be designed to carry out a set of instructions to perform a method of: receiving, at the non-primary beamformer originator station from the primary beamformer, a notification comprising indices of dedicated Multi-User (MU) groups allocated to the originator station.

Furthermore, according to embodiments of the present invention, the processor may be designed to carry out a set of instructions to perform a method of: transmitting, a notification by the non-primary beamformer originator station to a plurality of stations in the MU-MIMO communication network, the notification informing the receiving stations of their MU group membership status and of the corresponding range of MU group indices that were allocated to the non-primary beamformer originator station.

Furthermore, according to embodiments of the present invention, the processor may be designed to carry out a set of instructions to perform a method of: receiving at the non-primary beamformer originator station, from the primary beamformer, Multi-User (MU) group definitions.

Furthermore, according to embodiments of the present invention, the processor may be designed to carry out a set of instructions to perform a method of: transmitting a notification to the primary beamformer, the notification indicating that the non-primary beamformer originator station is no longer transmitting to a MU group that has been previously assigned to the non-primary beamformer originator station.

Furthermore, according to embodiments of the present invention, the processor may be designed to carry out a set of instructions to perform a method of: forming at the non-primary beamformer originator station Multi-User (MU) groups.

Furthermore, according to embodiments of the present invention, the processor may be designed to carry out a set of instructions to perform a method of: prior to receiving notification of the assignment, sending by the non-primary beamformer originator station a request to the primary beamformer to be assigned permission for MU-MIMO transmission.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
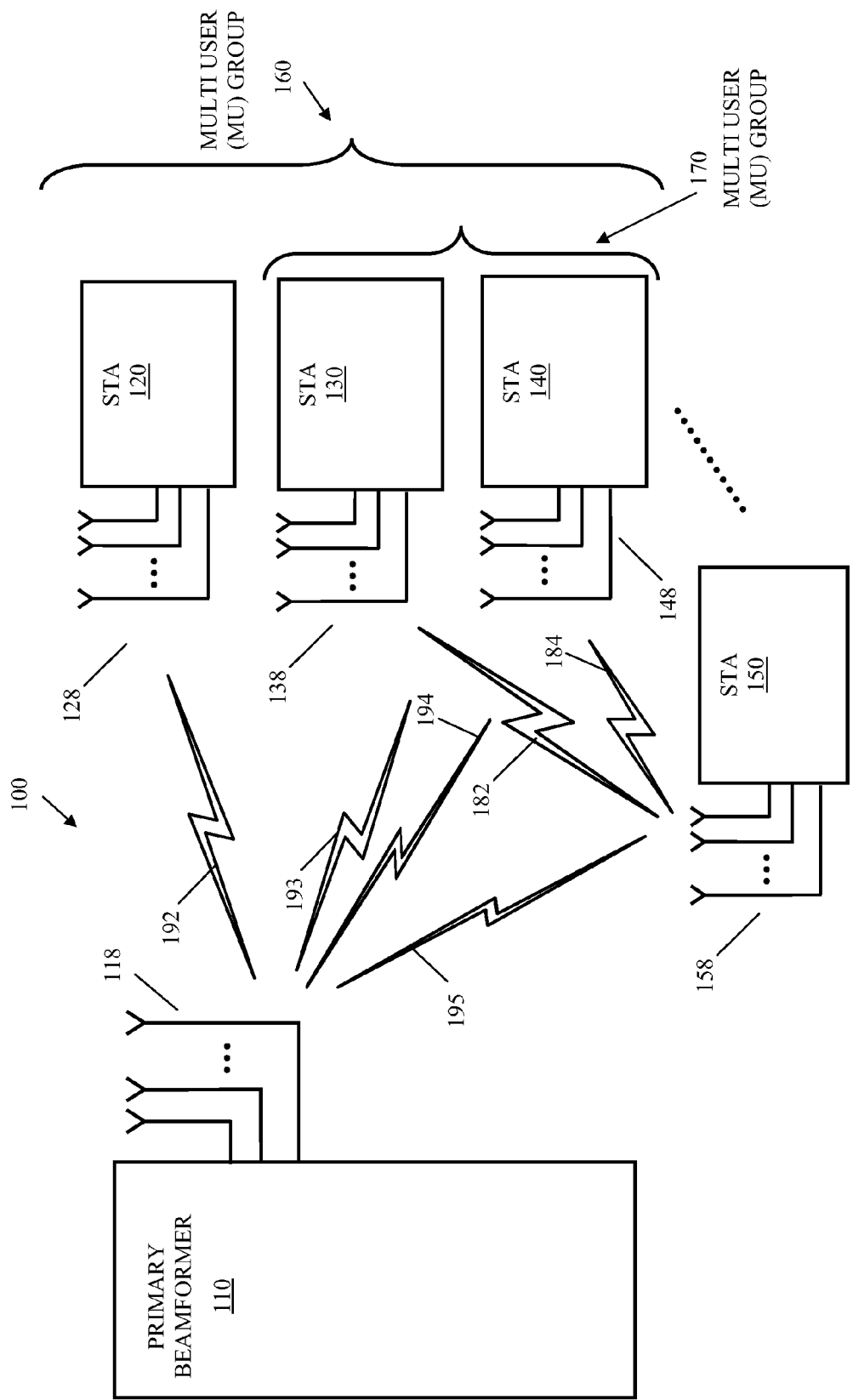
FIG. 1 schematically illustrates a block diagram of an MU-MIMO wireless communication network in accordance with demonstrative embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the present invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the present invention are not limited in this regard, the terms "plurality" and "a plurality"

as used herein may include, for example, "multiple" or "two or more". The terms "plurality" or "a plurality" may be used throughout the specification to describe two or more components, devices, units, parameters, or the like. Unless explicitly stated, the method embodiments described herein are not constrained to a particular order or sequence. Additionally, some of the described method embodiments or elements thereof can occur or be performed at the same point in time.

Stations intended to be included within the scope of the present invention include, by way of example only, Wireless Local Area Network (WLAN) stations, Wireless Personal Area Network (WPAN) stations, two-way radio stations, digital system stations, analog system stations, cellular radio-telephone stations, and the like.

Types of WLAN communication systems intended to be within the scope of the present invention include, although are not limited to, "IEEE-Std 802.11, 1999 Edition (ISO/IEC 8802-11: 1999)" standard, and more particularly in "IEEE-Std 802.11b-1999 Supplement to 802.11-1999, Wireless LAN MAC and PHY specifications: Higher speed Physical Layer (PHY) extension in the 2.4 GHz band", "IEEE-Std 802.11a-1999, Higher speed Physical Layer (PHY) extension in the 5 GHz band" standard, "IEEE Std 802.11n-2009," IEEE 802.11ac standard (e.g., as described in "IEEE 802.11-09/0992r21") and the like.

Types of WLAN stations intended to be within the scope of the present invention include, although are not limited to, stations for receiving and transmitting spread spectrum signals such as, for example, Frequency Hopping Spread Spectrum (FHSS), Direct Sequence Spread Spectrum (DSSS), Orthogonal Frequency-Division Multiplexing (OFDM) and the like.

Devices, systems and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a Local Area Network (LAN), a Wide Area Network (WAN), or a global communication network, for example, the Internet.

In typical applications, a basic service set (BSS) of a network may include a single management entity associated with a plurality of STAs. The management entity typically acts as a master that controls the STAs associated to it, including MU group management, and as a beamformer that performs MU-MIMO transmissions. As used herein, MU-MIMO transmission may be equivalent to any SDMA transmission. Embodiments of the present invention apply to MU-MIMO transmission as defined in IEEE 802.11ac standard, as well as to any other SDMA transmission.

As discussed above, according to the prior art, only a single entity in the BSS is permitted to perform tasks related to MU group management, and only a single entity is allowed to perform MU-MIMO transmissions. Typically, these tasks are performed by the single management entity, typically the AP. However, the above configuration may be rigid and lack the flexibility needed for modern communication systems.

In many scenarios, it would be beneficial for a node other than the AP to be able to transmit multiple streams to a plurality of STAs in the network using MU-MIMO transmission. For example, in a typical home video network, the AP which typically has MU-MIMO transmission capabilities, may receive video streams from a broadband network and may distribute the video streams wirelessly in the home using DL MU-MIMO transmission. In the same network, one of the STAs may be a digital video recorder (DVR) device that may be a second source of a plurality of video streams. In such a network it would be beneficial to allow DVR client instead of or in addition to the AP to perform DL MU-MIMO transmission. Another example would be a mesh network, in which each node can communicate with a plurality of other nodes.

As used herein, the term primary beamformer may refer to a single entity in a network or BSS that is allowed to grant permission for MU-MIMO transmission to other STAs. The primary beamformer may have many of the same characteristics as the single management entity described above, with the added capability to grant permission for MU-MIMO transmission to other STAs. Permission for MU-MIMO transmission may include permission for managing MU groups and for MU-MIMO transmission to other STAs, e.g. STAs pertaining to these MU groups. Throughout the present application, managing MU groups may include tasks related to, inter alia, forming and resetting MU groups, adding STAs or removing STAs from an existing MU group, and notifying other STAs of their MU group assignments. Embodiments of the invention are not limited to a specific identity of the primary beamformer; the primary beamformer may be the AP, and/or any other STA, of the network.

According to embodiments of the present invention, the DL MU-MIMO transmission scheme may be augmented to support MU-MIMO transmission originating from STAs other than the primary beamformer of the network. According to embodiments of the present invention, different originator stations may transmit in MU-MIMO mode to a plurality of other STAs, e.g. STAs grouped in MU groups.

The network may allow for the definition of MU groups, such that all nodes in a particular MU group may receive MU-MIMO transmissions to the MU group to which they are associated. In some embodiments, the number of MU groups supported by the network may be limited to a predetermined number of MU groups, denoted $N_g$. Each STA may pertain to none, some or all of the $N_g$ MU groups. Alternatively, the number of MU groups in the network need not be predetermined, and/or may be set dynamically. According to embodiments of the present invention, the STAs may be adapted to receive MU-MIMO transmissions from a plurality of originator stations, as well as from the primary beamformer. Accordingly, the STAs may be adapted to pertain to MU groups managed by the plurality of originator stations, as well as by the primary beamformer.

According to some embodiments of the present invention a single beamforming entity may be supported at any given time, however, the identity of the beamformer may change according to a decision of the primary beamformer. According to other embodiments of the present invention, different MU groups may be assigned to selected originator stations, wherein each originator STA may be the beamformer of its assigned MU group(s).

According to embodiments of the invention, enabling MU-MIMO transmission originating from STAs other than the primary beamformer of the network need not require increasing the complexity of other STAs of the network. According to some embodiments of the present invention, enabling MU-MIMO transmission originating from STAs other than the primary beamformer may be substantially transparent to other STAs. For example, by using embodiments of the invention described below, the overall number of supported MU groups need not be changed. For example, if a MU-MIMO network complying with the IEEE 802.11 ac standard is modified according to embodiments of the present invention, the overall number of supported MU groups may remain at 64, as defined by the IEEE 802.11ac standard. Keeping the overall number of supported MU groups constant may allow the STAs to continue maintaining a membership table of the same size as defined in the IEEE 802.11ac standard. For example, if a single beamforming entity is supported at any given time and the STAs are able to accept group definitions from any originator station, no other adjustment need be made in order to ensure proper operation of the present invention. Thus, for example, an existing MU-MIMO network having a single management entity may be upgraded to support a plurality of originator stations according to embodiments of the present invention, without modifying software or hardware of receiving STAs on the network, with the possible exception of non-AP originator stations. In addition, an STA conforming to the current IEEE 802.11ac standard, may be added, with substantially no modifications, to a MU-MIMO network supporting MU-MIMO transmission originating from STAs other than the primary beamformer according to embodiments of the present invention.

Reference is now made to FIG. 1 which schematically illustrates a block diagram of an MU-MIMO wireless communication network 100 in accordance with demonstrative embodiments of the present invention. It will be appreciated that the simplified components schematically illustrated in FIG. 1 are intended for demonstration purposes only, and that other components may be required for operation of the wireless devices. It will further be noted that the connection between components in a wireless device need not necessarily be exactly as depicted in the schematic diagram.

MU-MIMO wireless communication network 100 may include, for example, a primary beamformer 110. Primary beamformer 110 may typically be the wireless Access Points (AP), and act as a master of network 100. Primary beamformer 110 may have a plurality of transmit antennas 118, suitable, e.g., for SDMA transmission. Network 100 may also include one or more stations (STAs), e.g., STAs 120, 130, 140 and 150. STAs 120, 130, 140 and 150 may have one or more antennas 128, 138, 148 and 158, respectively, to receive transmissions from primary beamformer 110 as well as from other STAs, as will be discussed hereinbelow. Some or all of STAs 120, 130, 140 and 150 may pertain to one or more MU groups, such as MU groups 160 and 170. An MU group may include several STAs grouped to a particular SDMA group. For example, MU group 160 may include STAs 120, 130 and 140.

Primary beamformer 110 and STAs 120, 130, 140 and 150 may be implemented using any suitable combination of memory, hardwired logic, and/or general-purpose or special-purpose processors, as is known in the art. Antennas 118, 128, 138 and 148 may include, for example, internal and/or external radio frequency (RF) antennas, e.g., a dipole antenna, a monopole antenna, an end fed antenna, a circularly polarized antenna, a micro-strip antenna, a diversity antenna, an omni-directional antenna, a semi-omnidirectional antenna, and/or any other type of antenna suitable for transmission and/or reception of radio frequency signals within a wireless communication network.

According to embodiments of the present invention, primary beamformer 110 may communicate with one or more of STAs 120, 130, 140 and 150 via one or more wireless communication channels 192, 193, 194 and 195, respectively. Primary beamformer 110 may transmit to one or more of STAs 120, 130, 140 and/or 150 via multiple antennas 118 using an SDMA transmission scheme. STAs 120, 130, 140 and 150 may be adapted to SDMA operation or may operate according to legacy standards, e.g., IEEE 802.11.

Primary beamformer 110 may assign and manage MU groups, such as MU group 160. Typically primary beamformer 110 may handle up to a predetermined number of MU groups, denoted $N_g$. However, in other applications the number of MU groups may be unlimited. Primary beamformer 110 may transmit simultaneously to a plurality of STAs pertaining to an MU group. For example, primary beamformer 110 may transmit simultaneously to STAs 120, 130 and 140, pertaining to MU group 160.

According to embodiments of the present invention, other STAs in the network may be assigned, e.g., by primary beamformer 110, permission for MU-MIMO transmission. As used herein, stations or nodes that are assigned permission for MU-MIMO transmission may be referred to as originator stations. For example, STA 150 may be assigned, by e.g., primary beamformer 110, permission for MU-MIMO transmission. STA 150 may receive MU group definitions from primary beamformer 110, or may receive only indices of MU groups assigned to it. STA 150 may receive some or all of the MU group indices available to the network. STA 150 may manage the MU groups assigned to it, and may transmit simultaneously to STAs pertaining to the MU groups assigned to it. For example, STA 150 may be assigned with permission for MU-MIMO transmission to MU group 170. STA 150 may receive MU group definition from AP 110 or may receive only the MU group index. Receiving MU group definition may refer to receiving a MU group index accompanied by the list of STAs pertaining or belonging to that MU group. STA 150 may be assigned to manage MU group 170. For example, STA 150 may add STAs 130 and 140 to MU group 170. STA 150 may transmit simultaneously, using communication channels 182 and 184 to STAs 130 and 140 pertaining to MU group 170. Thus STA 150 may be seen as the beamformer of MU group 170.

It should be noted that according to embodiments of the present invention, an STA may be a receiver of a DL MU-MIMO transmission originated at primary beamformer 110 or at any other originator STA and a beamformer by itself. For example, STA 150 may pertain to MU groups (not shown) and receive DL MU-MIMO transmissions in addition to being an originator STA.

Figure 2:
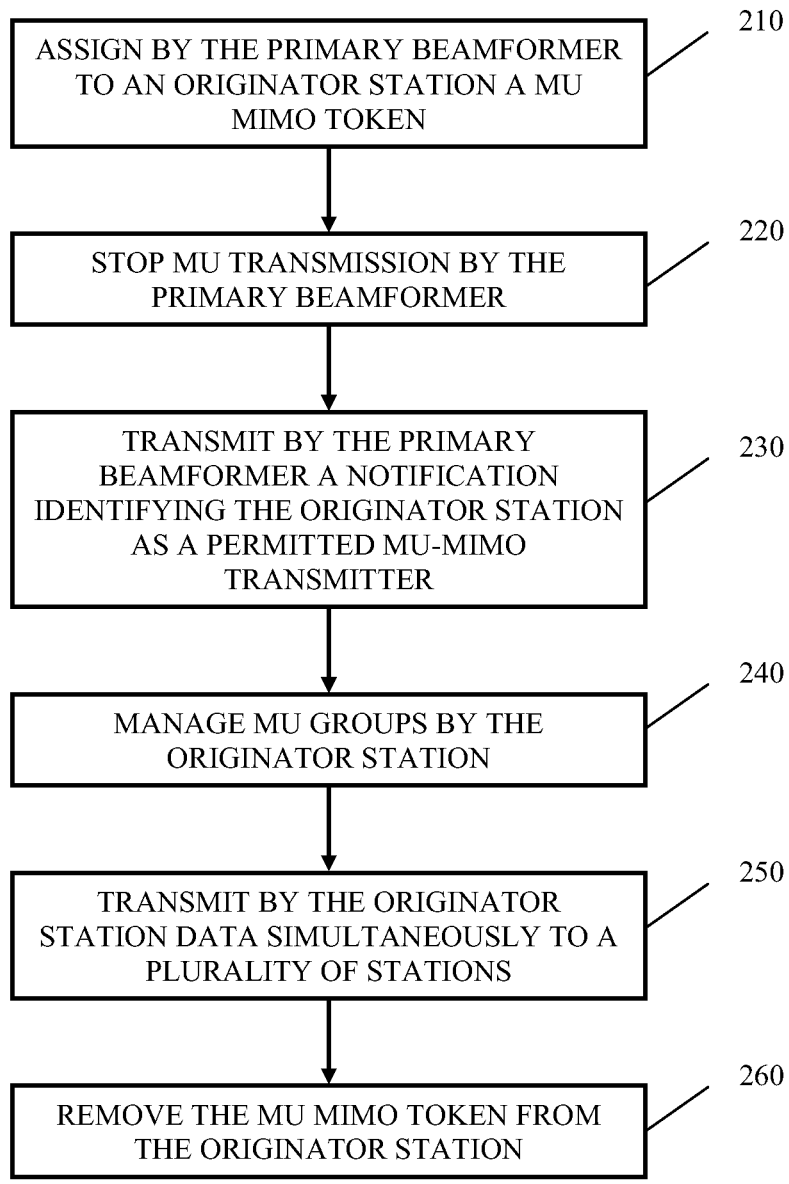
FIG. 2 is a flowchart illustration of a method for transferring a MU-MIMO transmission token according to embodiments of the present invention.

Reference is now made to FIG. 2 which is a flowchart illustration of a method for transferring a MU-MIMO transmission token according to embodiments of the present invention. In block 210, an originator station may be assigned a MU-MIMO transmission token by a primary beamformer, e.g., the AP. For example, when referring to network 100 presented in FIG. 1, STA 150 may be assigned a MU-MIMO transmission token by primary beamformer 110. By assigning a MU-MIMO transmission token to an originator station, the primary beamformer assigns to the originator station permission for MU-MIMO transmission using all the available MU groups. As indicated in block 220, the primary beamformer may refrain from performing MU-MIMO transmission while the primary beamformer has assigned the MU-MIMO transmission token to the originator station. Optionally, the primary beamformer or the originator station may transmit a notification to STAs in the network identifying the originator station as a permitted MU-MIMO transmitter, as indicated in block 230. The notification may be sent to each STA separately (e.g., via unicast) or may be broadcast to a plurality of STAs. The notification may be made by transmitting the MAC address of the originator station to the STAs, or by transmitting any other predetermined identifier of the originator station. Alternatively, only the originator station may be notified by the primary beamformer on its assignment as an originator station. In the latter case, since the STAs are not directly notified of a transfer of the transmission token, the STAs should be configured to receive MU-MIMO transmission from any originator station.

In block 240, the originator station may perform tasks related to MU group management. For example, when assigning the MU-MIMO transmission token to an originator station, the primary beamformer may reset all previously defined MU groups. The primary beamformer or an originator station may reset MU groups by, for example, sending MU group management frames to all stations pertaining to that MU group indicating to the STAs that they no longer pertain to that MU group. The assigned originator station may form new MU groups. An originator station may form a new MU group by, for example, sending MU group management frames to all stations pertaining to that new MU group indicating to the STAs that they pertain to that MU group. Alternatively, when assigning the MU-MIMO transmission token to an originator station, the primary beamformer may transfer to the originator station MU group definitions that were previously made by the primary beamformer. In any case, after receiving the MU-MIMO transmission token, the originator station may add and remove STAs form existing MU groups, or form new or reset MU groups. Such changes of MU groups may involve sending notifications to STAs, informing them of their new membership status.

In block 250, the originator station may transmit data simultaneously to the plurality of STAs pertaining to the plurality of MU groups. If in block 230 a notification was sent to STAs in the network, identifying the originator station as a permitted MU-MIMO transmitter, then the originator station may preferably start MU transmission after all other stations have acknowledged the new assignment. If no notification of the originator station was sent, the STAs may support receiving MU transmissions of data and management frames from any originator station without prior notice.

As indicated in block 260, the primary beamformer may decide to remove the MU transmission token from an originator station. The primary beamformer may remove the MU transmission token from an originator station by, for example, transmitting an appropriate notification to the originator station. When receiving such a notification, the originator station may stop all its MU-MIMO transmissions. The originator station may send a notification to the primary beamformer that it has stopped all its MU-MIMO transmissions. The originator station may reset the MU groups or may send MU group definitions to the primary beamformer. The primary beamformer may return to transmit DL MU MIMO transmission and/or may re-assign the MU transmission token to another originator station.

Figure 3:
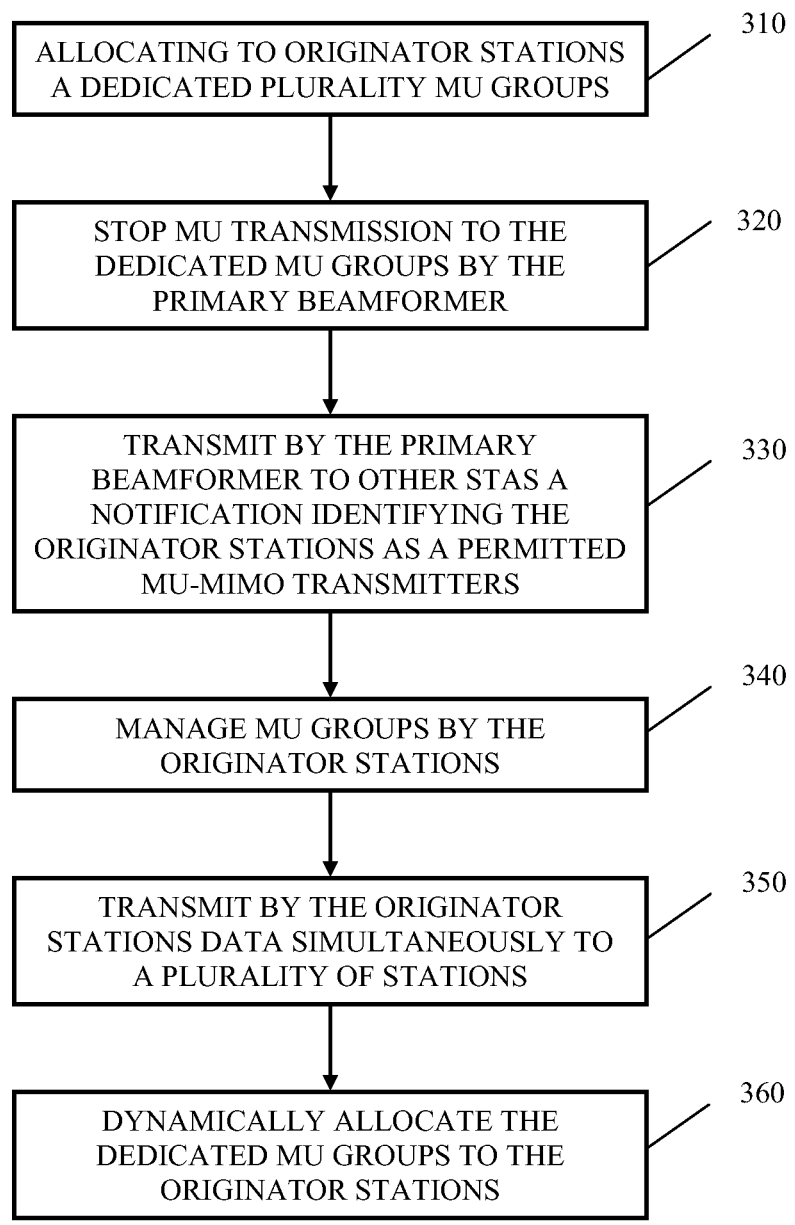
FIG. 3 is a flowchart illustration of a method for allowing simultaneous MU-MIMO transmission from the primary beamformer and from a plurality of originator stations according to embodiments of the present invention.

Reference is now made to FIG. 3 which is a flowchart illustration of a method for allowing simultaneous MU-MIMO transmission by a plurality of originator stations according to embodiments of the present invention. In block 310, one or more originator stations, other than or in addition to the primary beamformer, may be assigned MU-MIMO transmission permission. A dedicated plurality of MU groups may be allocated to the primary beamformer as well as to one or more originator stations, other than the primary beamformer. The plurality of MU groups may be allocated such that a first plurality of MU groups may be allocated to the primary beamformer, a second plurality may be allocated to a first originator station, a third plurality may be allocated to a second originator station, etc. For example, referring to network 100 presented in FIG. 1, a first plurality of MU groups may be allocated to primary beamformer 110, a second plurality may be allocated to a STA 150, a third plurality may be allocated to STA 120, etc. By allocating MU groups to an originator station, the primary beamformer assigns to each originator station permission for MU-MIMO transmission to the MU groups allocated to that originator station. An originator station may be notified by the primary beamformer of the assignment of permission for MU-MIMO transmission, and of the indices or other identifiers of the MU groups assigned to it. In addition, an originator station may be notified of the MU group definitions of these MU groups made by the primary beamformer, e.g. of the STAs belonging to these MU groups.

As indicated in block 320, the primary beamformer may stop MU-MIMO transmission to one or more MU group allocated to the originator stations. The primary beamformer may, however, continue MU-MIMO transmission to MU groups allocated to itself and/or may reallocate to itself MU groups previously allocated to other originator stations.

Optionally, the primary beamformer may transmit a notification to STAs in the network identifying the originator stations as permitted MU-MIMO transmitters, as indicated in block 330. The notification may be sent to each STA separately (unicast) or may be broadcast to a plurality of STAs. The notification may be done by transmitting the MAC addresses of the originator stations to the STAs, or by transmitting any other identifier of the originator station. Alternatively, if the STAs are configured to receive MU-MIMO transmission from any originator station, only the originator stations need to be notified on their assignment as an originator station.

The notification sent in block 330 may inform the STAs also of the MU groups allocated to each originator station. For example, each MU group may be denoted by an index and the indices of MU groups allocated to each originator station may be transmitted to the STAs. For example, in case a predetermined number of MU groups, denoted $N_g$, is supported by the network, each MU group may be denoted by an index ranging from 1 to g and the notification sent in block 330 may inform the STAs of the MU group indices allocated to each originator station. The STAs may transmit to the primary beamformer an acknowledgment on receiving the notification.

In block 340 the originator stations may perform tasks related to MU group management. For example, when assigning the MU transmission permission and a plurality of MU groups to an originator station, the primary beamformer may reset previously defined MU groups of the indices allocated to that originator station. Hence, the assigned station may form new MU groups. Alternatively, when assigning the MU-MIMO transmission permission and a plurality of MU groups to an originator station, the primary beamformer may transfer to the originator station MU group definitions that were previously made by the primary beamformer for these indices. In any case, after receiving the MU-MIMO transmission permission and the plurality of MU groups, the originator station may add and remove STAs form existing MU groups, or reset and form new MU groups using the indices allocated to that originator station. Changes in MU groups such as forming MU groups, resetting MU groups and adding and removing STAs form existing MU groups may involve sending notifications to STAs, informing them of their new membership status.

In block 350, the primary beamformer, as well as each of the originator stations may use the MU group allocated to them for MU-MIMO transmissions. The primary beamformer, as well as the originator stations may perform MU-MIMO transmission to the plurality of STAs pertaining to the plurality of MU groups allocated for them. If in block 330 the primary beamformer transmitted a notification to STAs in the network, identifying the originator stations as a permitted MU-MIMO transmitter, then the originator stations may preferably start MU transmission after the other stations have acknowledged the new assignment. If no notification of the originator station was sent, the STAs may be adapted to support receiving MU transmissions of data and management frames from any originator station without prior notice.

As indicated in block 360, the primary beamformer may dynamically allocate the dedicated MU groups to the originator stations. Dynamically allocating dedicated MU groups to originator stations may include adding more MU groups to an originator station, removing an MU groups form an originator station, assigning additional originator stations or depriving an STA from its MU-MIMO transmission permission. For example, the primary beamformer may request a selected originator station to stop transmitting to a selected MU group that has been previously assigned to that originator station. The primary beamformer may request a selected originator station to stop transmitting to a selected MU group by, for example, transmitting an appropriate notification to that originator station. The originator station may receive the request, stop its MU-MIMO transmissions to the selected MU group, and send an acknowledgment to the primary beamformer, that it is no longer transmitting to the selected MU group. Upon receiving the acknowledgment from the originator station, the primary beamformer may allocate the selected MU group to a different originator station. Alternatively, the primary beamformer may allocate the selected MU group to a different originator station after requesting the selected originator station to stop transmitting to a selected MU group without receiving the acknowledgment from the originator station.

According to some embodiments of the present invention, when the primary beamformer removes previously assigned MU groups from a particular originator station, the originator station may reset these MU groups before acknowledging the change to the primary beamformer. Alternatively, the deprived originator station may not reset the MU groups and send the group definitions to the primary beamformer.

According to the prior art MU-MIMO transmission scheme discussed above, the STAs may receive MU group data, such as membership status and position of spatial stream of the STA in the corresponding group, for example, by receiving a unicast notification of such. For example, the notification may include an assignment frame, also referred to as group ID frame, including, inter alia, a membership status bit for each MU group, wherein the value of that bit indicates to the STA if it pertains to that MU group or not. If the number of MU groups in the network is predetermined and constant, the length of the assignment frame may be fixed. Each STA may maintain a membership table of, for example, $N_g$ entries, one entry for each available MU group, and may update its membership status according to the assignment frame.

According to some embodiments of the present invention, in addition to the MU membership status described above, the originator stations may each transmit a notification informing other STAs of the corresponding range of MU group indices it was allocated. This may aid the STAs to manage their MU group memberships. Each STA may maintain a membership table with an entry for each available MU group. When an originating station that was granted a range of MU groups from the primary beamformer sends a notification informing the receiving STAs of their MU group membership status, with the addition of the range of indices allocated to that originating station, the receiving STA may know which indices in the membership table may be affected by that notification. In case of a fixed number of MU groups, this scheme allows transmitting by the various originator stations assignment frames having the same fixed length of the assignment frame of the prior art described above, e.g., in case of $N_g$ available MU groups, the assignment frames may include $N_g$ entries. Entries outside of the allocated range may equal, for example, zero, or any other value, however, since the receiving STA will ignore the entries that are outside of the allocated range, the receiving STA need not reset groups defined by other originator stations.

According to some embodiments of the present invention, STAs that would like to be assigned permission for MU-MIMO transmission, either to receive a MU-MIMO transmission token or a plurality of MU groups, may send a request to the primary beamformer. The request may include the number of MU group the STA needs. The request may also include other information that may be needed by the primary beamformer to decide whether to assign the STA with permission for MU-MIMO transmission. This information may include, for example, traffic needs, link budget to all target stations, or any other relevant metric. An STA may also notify the primary beamformer of the estimated gain from using MU-MIMO transmission over single user (SU) transmission.

In some embodiments the primary beamformer may gather the relevant information by itself. For example, the primary beamformer can use 802.11k protocol to gather relevant statistics from all STAs in its basic service set (BSS).

Some embodiments of the present invention may be implemented in software for execution by a processor-based system, for example, beamformer 110 and STAs 110, 120, 130, 140 and 150. For example, embodiments of the present invention may be implemented in code and may be stored on a non transitory storage medium having stored thereon instructions which can be used to program a system to perform the instructions. The storage medium may include, but is not limited to, any type of disk including floppy disks, optical disks, compact disk read-only memories (CD-ROMs), rewritable compact disk (CD-RW), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices. Other implementations of embodiments of the present invention may comprise dedicated, custom, custom made or off the shelf hardware, firmware or a combination thereof.

Embodiments of the present invention may be realized by a system that may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for Multi-User (MU) Multiple-Input-Multiple-Output (MIMO) transmission, the method comprising:
assigning permission for MU group management to an originator station having MU MIMO group management capabilities in a MU-MIMO wireless communication network, wherein said originator station is separated from a primary beamformer of the MU-MIMO communication network, wherein assigning said permission for MU group management comprises allocating to said originator station a dedicated plurality of Multi-User (MU) groups, and wherein the primary beamformer refrains from performing MU-MIMO transmission to the dedicated plurality of MU groups while the permission for MU-MIMO transmission is assigned to the originator station.

2. The method of claim 1, further comprising performing MU-MIMO transmission by the originator station to a plurality of stations in the MU-MIMO communication network.

3. The method of claim 1, wherein the primary beamformer in the MU-MIMO communication network refrains from: performing MU-MIMO transmission and managing the MU-MIMO groups while permission for MU-MIMO group management is assigned to the originator station.

4. The method of claim 3, wherein assigning said permission for MU group management comprises transferring to the originator station Multi-User (MU) group definitions that were previously made by the primary beamformer.

5. The method of claim 3, further comprising transmitting a notification by the primary beamformer to a plurality of stations in the MU-MIMO communication network, said notification identifying the originator station as a permitted MU-MIMO group manager.

6. The method of claim 1, wherein assigning said permission for MU group management comprises allocating to said originator station a dedicated plurality of Multi-User (MU) groups.

7. The method of claim 6 further comprising performing MU-MIMO transmission by the originator station to stations pertaining to said dedicated plurality of MU groups.

8. A method for Multi-User (MU) Multiple-Input-Multiple-Output (MIMO) transmission, the method comprising:
assigning to an originator station in a MU-MIMO wireless communication network, said originator station separate from a primary beamformer of the MU-MIMO communication network, permission for MU group management,
wherein assigning said permission for MU group management comprises allocating to said originator station a dedicated plurality of Multi-User (MU) groups, and
wherein the primary beamformer refrains from performing MU-MIMO transmission to the dedicated plurality of MU groups while the permission for MU-MIMO transmission is assigned to the originator station, and wherein the primary beamformer continues to perform MU-MIMO transmission to MU groups excluding the dedicated plurality of MU groups.

9. A method for Multi-User (MU) Multiple-Input-Multiple-Output (MIMO) transmission, the method comprising:
assigning to an originator station in a MU-MIMO wireless communication network, said originator station separate from a primary beamformer of the MU-MIMO communication network, permission for MU group management,
wherein assigning said permission for MU group management comprises allocating to said originator station a dedicated plurality of Multi-User (MU) groups,
wherein assigning said permission for MU-MIMO transmission comprises allocating to said originator station a first dedicated plurality of Multi-User (MU) groups, the method further comprising:
assigning to at least one additional originator station in the MU-MIMO communication network, said additional originator station being separate from the primary beamformer, permission for MU-MIMO group management, wherein assigning said permission to said at least one additional originator station comprises allocating to each of said at least one additional originator station a corresponding dedicated plurality of Multi-User (MU) groups; and wherein the primary beamformer refrains from performing MU-MIMO transmission to the dedicated plurality of MU groups while the permission for MU-MIMO transmission is assigned to the at least one additional originator station, and wherein the primary beamformer continues to perform MU-MIMO transmission to MU groups excluding the dedicated plurality of MU groups.

10. The method of claim 9, further comprising performing MU-MIMO transmission by the additional originator station to stations pertaining to its respective of MU groups.

11. The method of claim 9, comprising transmitting a notification by the primary beamformer to said plurality of stations, said notification identifying the at least one additional originator station as a permitted MU-MIMO transmitter and informing of the dedicated MU groups respectively assigned to the at least one additional originator station.

12. The method of claim 9, comprising dynamically allocating the dedicated MU groups to the originator stations.

13. The method of claim 12, wherein dynamically allocating the dedicated MU groups comprises:
requesting a first selected originator station to stop transmitting to a selected MU group, the selected MU group has been previously assigned to the first selected originator station; and
allocating the selected MU group to a second selected originator station.

14. The method of claim 13, wherein dynamically allocating the dedicated MU groups comprises:
receiving an acknowledgment from the first selected originator station that it is no longer transmitting to the selected MU group prior to allocating the selected MU group to the second selected originator station.

15. The method of claim 1, comprising:
receiving a request from the originator station to be assigned permission for MU-MIMO group management prior to assigning said permission for MU group management.

16. The method of claim 1, wherein the primary beamformer is an access point (AP).

17. A method for Multi-User (MU) Multiple-Input-Multiple-Output (MIMO) group management by a non-primary beamformer originator station of a MU-MIMO communication network having MU MIMO group management capabilities, the method comprising:
receiving, at the non-primary beamformer originator station, notification of an assignment, from a primary beamformer of the MU-MIMO communication network, of permission for MU-MIMO group management by the non-primary beamformer originator station,
wherein assigning said permission for MU group management comprises allocating to said originator station a dedicated plurality of Multi-User (MU) groups, and
wherein the primary beamformer refrains from performing MU-MIMO transmission to the dedicated plurality of MU groups while the permission for MU-MIMO transmission is assigned to the originator station.

18. The method of claim 17, comprising:
performing MU-MIMO transmission by the non-primary beamformer originator station to a plurality of stations in the MU-MIMO communication network.

19. The method of claim 17, comprising:
receiving, at the non-primary beamformer originator station from the primary beamformer, a notification comprising indices of dedicated Multi-User (MU) groups allocated to the originator station.

20. A method for Multi-User (MU) Multiple-Input-Multiple-Output (MIMO) group management by a non-primary beamformer originator station of a MU-MIMO communication network, the method comprising:
receiving, at the non-primary beamformer originator station, notification of an assignment, from a primary beamformer of the MU-MIMO communication network, of permission for MU-MIMO group management by the non-primary beamformer originator station; and
transmitting, a notification by the non-primary beamformer originator station to a plurality of stations in the MU-MIMO communication network, said notification informing the receiving stations of their MU group membership status and of the corresponding range of MU group indices that were allocated to the non-primary beamformer originator station.

21. The method of claim 17, comprising:
receiving at the non-primary beamformer originator station, from the primary beamformer, Multi-User (MU) group definitions.

22. A method for Multi-User (MU) Multiple-Input-Multiple-Output (MIMO) group management by a non-primary beamformer originator station of a MU-MIMO communication network, the method comprising:
receiving, at the non-primary beamformer originator station, notification of an assignment, from a primary beamformer of the MU-MIMO communication network, of permission for MU-MIMO group management by the non-primary beamformer originator station; and
transmitting a notification to the primary beamformer, said notification indicating that the non-primary beamformer originator station is no longer transmitting to a MU group that has been previously assigned to the non-primary beamformer originator station.

23. The method of claim 17, comprising:
forming at the non-primary beamformer originator station Multi-User (MU) groups.

24. The method of claim 17, comprising:
prior to receiving notification of said assignment, sending by the non-primary beamformer originator station a request to the primary beamformer to be assigned permission for MU-MIMO transmission.

25. A primary beamformer comprising:
a processor; and
a computer usable medium connected to the processor, wherein the computer usable medium contains a set of instructions for performing a multiple-user multiple-input multiple-output (MU-MIMO) transmission in a MU-MIMO communication network, wherein the processor is designed to carry out a set of instructions to perform a method of:
assigning to an originator station in a MU-MIMO wireless communication network having MU MIMO group management capabilities, said originator station being separated from the primary beamformer of the MU-MIMO communication network, permission for MU group management,
wherein assigning said permission for MU group management comprises allocating to said originator station a dedicated plurality of Multi-User (MU) groups, and
wherein the primary beamformer refrains from performing MU-MIMO transmission to the dedicated plurality of MU groups while the permission for MU-MIMO transmission is assigned to the originator station.

26. The primary beamformer of claim 25, wherein the processor is designed to carry out a set of instructions to further perform a method of:
refraining from performing MU-MIMO transmission while permission for MU-MIMO group management is assigned to the originator station.

27. The primary beamformer of claim 26, wherein the processor is designed to carry out a set of instructions to further perform a method of:
transferring to the originator station Multi-User (MU) group definitions that were previously made by the primary beamformer.

28. The primary beamformer of claim 26 wherein the processor is designed to carry out a set of instructions to further perform a method of:
transmitting a notification by the primary beamformer to a plurality of stations in the MU-MIMO communication network, said notification identifying the originator station as a permitted MU-MIMO group manager.

29. The primary beamformer of claim 25, wherein the processor is designed to carry out a set of instructions to further perform a method of:
allocating to said originator station a dedicated plurality of Multi-User (MU) groups.

30. The primary beamformer of claim 29, wherein the processor is designed to carry out a set of instructions to further perform a method of:
refraining from performing MU-MIMO transmission to the dedicated plurality of MU groups while the permission for MU-MIMO transmission is assigned to the originator station; and
continuing to perform MU-MIMO transmission to MU groups excluding the dedicated plurality of MU groups.

31. The primary beamformer of claim 29, wherein assigning said permission for MU-MIMO transmission comprises allocating to said originator station a first dedicated plurality of Multi-User (MU) groups and wherein the processor is designed to carry out a set of instructions to further perform a method of:
assigning to at least one additional originator station in the MU-MIMO communication network, said additional originator station being separate from the primary beamformer, permission for MU-MIMO group management, wherein assigning said permission to said at least one additional originator station comprises allocating to each of said at least one additional originator station a corresponding dedicated plurality of Multi-User (MU) groups; and
refraining from performing MU-MIMO transmission to the dedicated plurality of MU groups while the permission for MU-MIMO transmission is assigned to the at least one additional originator station; and
continuing to perform MU-MIMO transmission to MU groups excluding the dedicated plurality of MU groups.

32. The primary beamformer of claim 31, wherein the processor is designed to carry out a set of instructions to further perform a method of:
transmitting a notification by the primary beamformer to said plurality of stations, said notification identifying the at least one additional originator station as a permitted MU-MIMO transmitter and informing of the dedicated MU groups respectively assigned to the at least one additional originator station.

33. The primary beamformer of claim 31, wherein the processor is designed to carry out a set of instructions to further perform a method of: dynamically allocating the dedicated MU groups to the originator stations.

34. The primary beamformer of claim 33, wherein dynamically allocating the dedicated MU groups comprises:
   requesting a first selected originator station to stop transmitting to a selected MU group, the selected MU group has been previously assigned to the first selected originator station; and
   allocating the selected MU group to a second selected originator station.

35. The primary beamformer of claim 33, wherein dynamically allocating the dedicated MU groups comprises:
   receiving an acknowledgment from the first selected originator station that it is no longer transmitting to the selected MU group prior to allocating the selected MU group to the second selected originator station.

36. The primary beamformer of claim 25, wherein the processor is designed to carry out a set of instructions to further perform a method of:
   receiving a request from the originator station to be assigned permission for MU-MIMO group management prior to assigning said permission for MU group management.

37. A non-primary beamformer originator station comprising:
   a processor; and
   a computer usable medium connected to the processor, wherein the non-primary beamformer originator station has MU MIMO group management capabilities, wherein the computer usable medium contains a set of instructions for group management by the non-primary beamformer originator station in a MU-MIMO communication network, wherein the processor is designed to carry out a set of instructions to perform a method of:
   receiving, at the non-primary beamformer originator station, notification of an assignment, from a primary beamformer of the MU-MIMO communication network, of permission for MU-MIMO group management by the non-primary beamformer originator station,
   wherein assigning said permission for MU group management comprises allocating to said originator station a dedicated plurality of Multi-User (MU) groups, and
   wherein the primary beamformer refrains from performing MU-MIMO transmission to the dedicated plurality of MU groups while the permission for MU-MIMO transmission is assigned to the originator station.

38. The originator station of claim 37, wherein the processor is designed to carry out a set of instructions to further perform a method of:
   performing MU-MIMO transmission by the non-primary beamformer originator station to a plurality of stations in the MU-MIMO communication network.

39. The originator station of claim 37, wherein the processor is designed to carry out a set of instructions to further perform a method of:
   receiving, at the non-primary beamformer originator station from the primary beamformer, a notification comprising indices of dedicated Multi-User (MU) groups allocated to the originator station.

40. The originator station of claim 37, wherein the processor is designed to carry out a set of instructions to further perform a method of:
   transmitting, a notification by the non-primary beamformer originator station to a plurality of stations in the MU-MIMO communication network, said notification informing the receiving stations of their MU group membership status and of the corresponding range of MU group indices that were allocated to the non-primary beamformer originator station.

41. The originator station of claim 37, wherein the processor is designed to carry out a set of instructions to further perform a method of:
   receiving at the non-primary beamformer originator station, from the primary beamformer, Multi-User (MU) group definitions.

42. The originator station of claim 37, wherein the processor is designed to carry out a set of instructions to further perform a method of:
   transmitting a notification to the primary beamformer, said notification indicating that the non-primary beamformer originator station is no longer transmitting to a MU group that has been previously assigned to the non-primary beamformer originator station.

43. The originator station of claim 37, wherein the processor is designed to carry out a set of instructions to further perform a method of:
   forming at the non-primary beamformer originator station Multi-User (MU) groups.

44. The originator station of claim 37, wherein the processor is designed to carry out a set of instructions to further perform a method of:
   prior to receiving notification of said assignment, sending by the non-primary beamformer originator station a request to the primary beamformer to be assigned permission for MU-MIMO transmission.

* * * * *